United States Patent
Kou et al.

(10) Patent No.: US 12,227,618 B2
(45) Date of Patent: *Feb. 18, 2025

(54) POLYALKYLENEIMINE-BASED POLYMER CONTAINING POLYETHER CHAINS

(71) Applicant: BASF SE, Ludwigshafen am Rhein (DE)

(72) Inventors: Huiguang Kou, Ludwigshafen am Rhein (DE); Steffen Onclin, Ludwigshafen am Rhein (DE); Anna Maria Mueller-Cristadoro, Lemfoerde (DE); Clemens Auschra, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 338 days.

This patent is subject to a terminal disclaimer.

(21) Appl. No.: 17/761,605

(22) PCT Filed: Sep. 16, 2020

(86) PCT No.: PCT/EP2020/075834
§ 371 (c)(1),
(2) Date: Mar. 18, 2022

(87) PCT Pub. No.: WO2021/052997
PCT Pub. Date: Mar. 25, 2021

(65) Prior Publication Data
US 2022/0403106 A1    Dec. 22, 2022

(30) Foreign Application Priority Data

Sep. 20, 2019 (EP) .................................. 19198569

(51) Int. Cl.
*C08G 73/02* (2006.01)
*C09D 5/02* (2006.01)
*C09K 23/16* (2022.01)
*C09K 23/42* (2022.01)

(52) U.S. Cl.
CPC ....... *C08G 73/024* (2013.01); *C08G 73/0213* (2013.01); *C09D 5/027* (2013.01); *C09K 23/16* (2022.01); *C09K 23/42* (2022.01)

(58) Field of Classification Search
None
See application file for complete search history.

(56) References Cited

U.S. PATENT DOCUMENTS

2016/0264731 A1   9/2016   Thetford et al.
2019/0092903 A1   3/2019   Kou et al.

FOREIGN PATENT DOCUMENTS

| CA | 2798371 A1 | * | 7/2012 |
| CN | 108816152 A | * | 11/2018 |
| EP | 2272893 A1 | | 1/2011 |
| WO | 92/13911 A1 | | 8/1992 |
| WO | 2008/107326 A1 | | 9/2008 |

OTHER PUBLICATIONS

International Preliminary Report on Patentability received for PCT Patent Application No. PCT/EP2020/075834, mailed on Mar. 31, 2022, 8 pages.
International Search Report and Written Opinion received for PCT Patent Application No. PCT/EP2020/075834, mailed on Nov. 16, 2020, 8 pages.

* cited by examiner

*Primary Examiner* — Tae H Yoon
(74) *Attorney, Agent, or Firm* — Faegre Drinker Biddle & Reath LLP

(57) ABSTRACT

The presently claimed invention relates to polyalkyleneimine-based polymers that are useful as dispersants and a process for the preparation thereof. The presently claimed invention is also directed to dispersants that are useful in solvent-based dispersion systems as well as in water-based dispersion systems.

22 Claims, No Drawings

POLYALKYLENEIMINE-BASED POLYMER CONTAINING POLYETHER CHAINS

CROSS-REFERENCE TO RELATED APPLICATIONS

This application is a national stage application (under 35 U.S.C. § 371) of PCT/EP2020/075834, filed Sep. 16, 2020, which claims benefit of European Application No. 19198569.6, filed Sep. 20, 2019, both of which are incorporated herein by reference in their entirety.

FIELD OF THE INVENTION

The presently claimed invention relates to polyalkyleneimine-based polymers containing polyether chains that are useful as dispersants and a process for the preparation thereof. The presently claimed invention is also directed to dispersants that are useful in solvent-based dispersion systems as well as in water-based dispersion systems.

BACKGROUND OF THE INVENTION

Dispersions containing solid dispersible particles, such as organic or inorganic pigments, are used for a number of different technical applications, e.g. as coating materials, for printing inks, colouring plastic materials, including fibres, glasses, or ceramic products, for formulations in cosmetics, or for the preparation of paint systems, in particular the automotive, industrial and decorative paints.

The preparation of dispersions involves incorporation of the solid materials such as pigments into a liquid vehicle by replacing the pigment-air interfaces with pigment-vehicle interfaces, which is facilitated by the presence of a dispersant. Even though certain organic vehicles have good particle wetting properties, dispersants are used to ensure a uniform and stable dispersion. Dispersants also have a bearing on various process parameters involved in preparation of dispersion such as dispersion time and energy requirement. An ideal dispersion consists of a homogenous and stable suspension of solid materials after size reduction or milling of any aggregates and agglomerates.

A dispersant improves various dispersion properties such as millbase viscosity and rheology behavior. An enhanced rheology behaviour is characterized by suitable viscosities over a wide range of shear rates. An improvement in viscosity and rheology behaviour leads to improved application properties such as better flowability and levelling, less spattering and sagging of the coating.

The dispersant is also a determining factor of the aesthetics and physical properties of a coating. A dispersant can act as a flow control agent and bring about improved spreading of the composition over the surface of the substrate and improve the flow of the polymer film which forms in the course of curing, resulting in a smooth surface. As a consequence, the dispersant reduces the formation of defects, known as craters, which are caused by impurities acting from the outside or by impurities on the surface of the substrate.

Due to environmental concerns, the use of pigment dispersions based on aqueous vehicles as well as the dispersions based on organic solvents with high solids content are particularly preferred. Depending on the type and the polarity of the liquid phase, e.g. water, organic solvents or mixtures thereof, an appropriate polymeric dispersant is selected.

In view of the wide application of dispersions containing fine particulate solid materials and the important role played by the dispersants in their preparation, stability and properties, there is a growing need for improved dispersants that can assist the preparation of dispersions having the desired characteristics.

WO 1992/13911 A1 relates to an acetoacetanilide functionalized poly(alkylene glycol), which is prepared by reacting a poly(alkylene glycol) monoamine, diamine or triamine with isatoic anhydride followed by acetoacetylation of the resultant aminobenzamide. WO 1992/13911 A1 suggests using said acetoacetanilide functionalized poly(alkylene glycols for preparing the improved diarylide pigment compositions, which in turn are useful for preparing the storage stable printing inks, especially of the publication gravure type inks.

WO 2008/107326 A1 relates to poly(alkylene imine) grafted polymers of the acrylate, polyether or polyester type, which are useful as pigment dispersants.

Accordingly, it is an object of the presently claimed invention to provide dispersants having improved pigment affinity and rheology behaviour, as expressed by the viscosity of the millbase at a given shear rate and improved gloss of the surface coatings. Further, it is desired that the dispersant can be used in solvent-based systems and in water-based systems.

SUMMARY OF THE INVENTION

Surprisingly, it was found that the polymers of the presently claimed invention having (a) a polyalkyleneimine backbone; (b) at least one aromatic moiety P.1, which is bound to a nitrogen atom of the polyalkyleneimine backbone via a carboxamide or carboximide group; and c) at least one aliphatic polyether moiety P.2, which is bound to a nitrogen atom of the polyalkyleneimine backbone via a direct bond or via a linker are useful as dispersants having improved pigment affinity so that the dispersants provide millbases and/or paint compositions having improved rheology behaviour, as expressed by the viscosity at a given shear rate, and improved gloss and finishing of the surface coatings that are prepared by using the millbases and/or paint compositions. These dispersants have a high pigment affinity and they can be used in solvent-based systems as well as in water-based systems.

Accordingly, the main aspect of the presently claimed invention is directed to a polymer having
  a) a polyalkyleneimine backbone;
  b) at least one aromatic moiety P.1, which is bound to a nitrogen atom of the polyalkyleneimine backbone via a carboxamide or carboximide group; and
  c) at least one aliphatic polyether moiety P.2, which is bound to a nitrogen atom of the polyalkyleneimine backbone via a linker L.

In another aspect, the presently claimed invention provides a process for preparing the polymer. The process comprises the following steps,
  i. A polyalkyleneimine is reacted with an aromatic carboxylic acid, an aromatic carboxylic anhydride or with an amide or imide forming derivative of an aromatic carboxylic acid, in such an amount that theoretically at most 90%, based on the total amount of primary and secondary nitrogen atoms of the polyalkyleneimine can be consumed.
  ii. The product of step (i) is reacted with an aliphatic polyether moiety having a terminal radical selected from an acrylate, an iscyanato, and a carboxylate.

In yet another aspect, the presently claimed invention provides a liquid composition in the form of a dispersion comprising a particulate solid material selected from the group consisting of pigments and fillers, and a liquid diluent, wherein the particulate solid material is dispersed in the liquid diluent, further comprising a polymer of the presently claimed invention.

In yet another aspect, presently claimed invention is directed to use of polymer of the presently claimed invention as a component of a coating composition or an ink composition.

DETAILED DESCRIPTION

Before the present compositions and formulations of the presently claimed invention are described, it is to be understood that this invention is not limited to particular compositions and formulations described, since such compositions and formulation may, of course, vary. It is also to be understood that the terminology used herein is not intended to be limiting, since the scope of the presently claimed invention will be limited only by the appended claims.

If hereinafter a group is defined to comprise at least a certain number of embodiments, this is meant to also encompass a group which preferably consists of these embodiments only. Furthermore, the terms 'first', 'second', 'third' or 'a', 'b', 'c', etc. and the like in the description and in the claims, are used for distinguishing between similar elements and not necessarily for describing a sequential or chronological order. It is to be understood that the terms so used are interchangeable under appropriate circumstances and that the embodiments of the presently claimed invention described herein are capable of operation in other sequences than described or illustrated herein. In case the terms 'first', 'second', 'third' or '(A)', '(B)' and '(C)' or '(a)', '(d)', 'i', 'ii' etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

Furthermore, the ranges defined throughout the specification include the end values as well, i.e. a range of 1 to 10 implies that both 1 and 10 are included in the range. For the avoidance of doubt, applicant shall be entitled to any equivalents according to applicable law.

In the following passages, different aspects of the presently claimed invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to 'one embodiment' or 'an embodiment' means that a particular feature, structure or characteristic described in connection with the embodiment is included in at least one embodiment of the presently claimed invention. Thus, appearances of the phrases 'in one embodiment' or 'in an embodiment' in various places throughout this specification are not necessarily all referring to the same embodiment, but may refer to the same embodiment. Further, as used in the following, the terms "preferably", "more preferably", "even more preferably", "most preferably" and "in particular" or similar terms are used in conjunction with optional features, without restricting alternative possibilities. Thus, features introduced by these terms are optional features and are not intended to restrict the scope of the claims in any way.

Furthermore, the particular features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the presently claimed invention, and form different embodiments, as would be understood by those in the art. For example, in the appended claims, any of the claimed embodiments can be used in any combination.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Surprisingly, the polymers of the presently claimed invention are found to be useful as dispersants. These dispersants have a high pigment affinity. A millbase prepared using the dispersant has a low millbase viscosity.

For preparing a dispersion containing a fine particulate solid material, such as a paint composition, the dispersant can be used in a solvent-based system as well as in a water-based system. The dispersion has a high stability and a low viscosity. The paint composition provides a surface coating with a high gloss and a low crater ranking.

Accordingly, the main aspect of the presently claimed invention is directed to a polymer having
  a) a polyalkyleneimine backbone;
  b) at least one aromatic moiety P.1, which is bound to a nitrogen atom of the polyalkyleneimine backbone via a carboxamide or carboximide group; and
  c) at least one aliphatic polyether moiety P.2, which is bound to a nitrogen atom of the polyalkyleneimine backbone via a linker L.

Within the context of the presently claimed invention, the term "alkyl", as used herein, refers to an acylic saturated aliphatic group, including linear or branched alkyl saturated hydrocarbon radicals, denoted by a general formula $C_nH_{2n+1}$ and wherein n is the number of carbon atoms such as 1, 2, 3, 4, etc.

The term "aryl", as used herein, refers to mono- or polycyclic, optionally substituted aromatic radicals having 6 to 20 ring carbon atoms. The term "heteroaryl" refers to "aryl" groups as described above and containing 1, 2, 3, 4, 5 or 6 heteroatom(s) such as N or O. The term "alkylaryl" refers to alkyl-substituted analogs of the above "aryl" groups.

In a preferred embodiment of the presently claimed invention, the polyalkyleneimine backbone has a weight average molecular weight in the range of from 100 g/mol to 20,000 g/mol, as determined according to DIN 55672-1.

In a more preferred embodiment of the presently claimed invention, the polyalkyleneimine backbone has a weight average molecular weight in the range of from 300 g/mol to 10,000 g/mol, as determined according to DIN 55672-1.

In an even more preferred embodiment of the presently claimed invention, the polyalkyleneimine backbone has a weight average molecular weight in the range of from 500 g/mol to 5,000 g/mol, as determined according to DIN 55672-1.

In a most preferred embodiment of the presently claimed invention, the polyalkyleneimine backbone has a weight average molecular weight in the range of from 500 g/mol to 2,500 g/mol, as determined according to DIN 55672-1.

In a preferred embodiment of the presently claimed invention, the polyalkyleneimine backbone is a polyethyleneimine backbone.

In a particularly preferred embodiment of the presently claimed invention, the polyethyleneimine backbone has a weight average molecular weight of 800 g/mol, as determined according to DIN 55672-1.

In a preferred embodiment of the presently claimed invention, the at least one aromatic moiety P.1 is selected from the moieties of the formulae (P.1') and (P.1"),

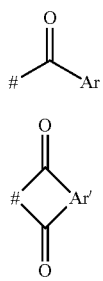

(P.1')

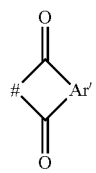

(P.1")

wherein

\# indicates the point of attachment of the aromatic moiety P.1 to a nitrogen atom of the polyalkyleneimine backbone;

Ar is selected from the group consisting of phenyl and naphthyl, wherein phenyl and naphthyl, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(=O)—OH, C(=O)—$NH_2$, $NH_2$, $NO_2$, NH—C(=O)—H, NH—$C_1$-$C_4$-alkyl and NH—C(=O)—$C_1$-$C_4$-alkyl; and Ar' is selected from the group consisting of 1,2-phenylene, 1,2-, 2,3-, or 1,8-naphthylene, wherein phenylene and naphthylene, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(=O)—OH, C(=O)—$NH_2$, $NH_2$, $NO_2$, NH—C(=O)—H, NH—$C_1$-$C_4$-alkyl and NH—C(=O)—$C_1$-$C_4$-alkyl.

In a preferred embodiment of the presently claimed invention, the at least one aromatic moiety P.1 is selected from the group consisting of moieties of formulae (P.1a), (P.1b), (P.1c), (P.1d), and (P.1e),

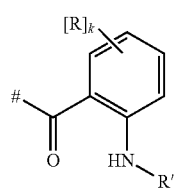

(P.1a)

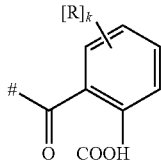

(P.1b)

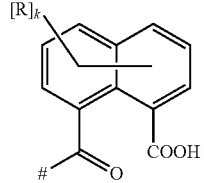

(P.1c)

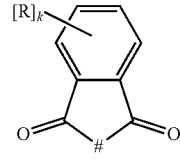

(P.1d)

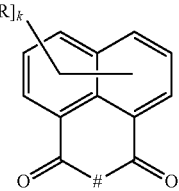

(P.1e)

wherein

\# indicates the point of attachment of the aromatic moiety to a nitrogen atom of the polyalkyleneimine backbone;

R' is selected from the group consisting of hydrogen, $C_1$-$C_4$-alkyl, —C(=O)—H and —C(=O)—$C_1$-$C_4$-alkyl;

k is 0, 1, 2, 3 or 4; and

R is, identical or different, a radical selected from the group consisting of halogen, OH, $C_1$-$C_4$-alkyl, $C_1$-$C_4$-alkoxy, C(=O)—OH, C(=O)—$NH_2$, $NH_2$, $NO_2$, NH—C(=O)—H, NH—$C_1$-$C_4$-alkyl and NH—C(=O)—$C_1$-$C_4$-alkyl.

In a particularly preferred embodiment of the presently claimed invention, the at least one aromatic moiety P.1 is a moiety of formula (P.1a) having R'=H and K=0.

In another particularly preferred embodiment of the presently claimed invention, the at least one aromatic moiety P.1 is a moiety of formula (P.1b) having K=0.

In another particularly preferred embodiment of the presently claimed invention, the at least one aromatic moiety P.1 is a moiety of formula (P.1c) having K=0.

In another particularly preferred embodiment of the presently claimed invention, the at least one aromatic moiety P.1 is a moiety of formula (P.1d) having K=0.

In yet another particularly preferred embodiment of the presently claimed invention, the at least one aromatic moiety P.1 is a moiety of formula (P.1e) having K=0.

In a preferred embodiment of the presently claimed invention, the at least one aliphatic polyether moiety P.2 is

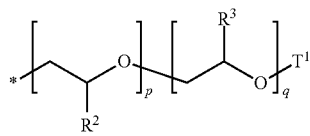
(P.2)

wherein,
* indicates the point of attachment to a linker L;
$R^2$ and $R^3$ are each independently selected from the group consisting of hydrogen and $C_1$-$C_2$-alkyl;
p is an integer from 0 to 200;
q is an integer from 0 to 200;
p+q is an integer from 2 to 200; and
$T^1$ is hydrogen, $C_1$-$C_{20}$-alkyl, $C_2$-$C_{20}$-alkenyl, $C(=O)$—$C_1$-$C_{20}$-alkyl or $C(=O)$—$C_2$-$C_{20}$-alkenyl; wherein $C_2$-$C_{20}$-alkenyl has 1, 2, 3 or 4 olefinic C=C-double bonds, and wherein 1, 2, 3, or 4 non-adjacent $CH_2$ groups of $C_1$-$C_{20}$-alkyl may be replaced by O.

In a preferred embodiment of the presently claimed invention,
p is an integer from 0 to 100;
q is an integer from 0 to 100; and
p+q is an integer from 2 to 100.

In a preferred embodiment of the presently claimed invention,
$R^2$ is H, p is an integer from 2 to 100;
q is 0; and
$T^1$ is H.

In a preferred embodiment of the presently claimed invention,
$R^2$ is H, p is an integer from 1 to 100;
$R^3$ is —$CH_3$, q is an integer 1 to 100;
p+q is an integer from 2 to 150 and
$T^1$ is H or $CH_3$.

In a preferred embodiment of the presently claimed invention, the linker L is at least one selected from the group consisting of (L.1), (L.2), (L.3), (L.4) and (L.5)

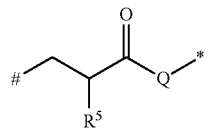
L.1

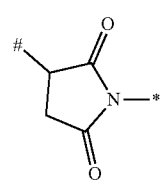
L.2

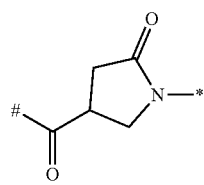
L.3

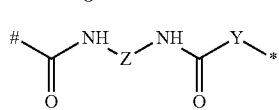
L.4

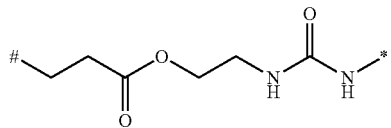
L.5 wherein
# indicates the point of attachment to a nitrogen atom of the polyalkyleneimine backbone;
* indicates the point of attachment to the aliphatic polyether moiety P.2;
$R^5$ is H or $CH_3$;
Q is a direct bond or a divalent moiety selected from —O—, —N(H)—, and —S—;
Y is O or NH;
Z is selected from the group consisting of $C_1$-$C_{24}$ alkyl, $C_4$-$C_{10}$ cycloalkyl, $C_6$-$C_{18}$ aryl, and $C_7$-$C_{20}$ arylalkyl;

In a particularly preferred embodiment of the presently claimed invention, the at least one aliphatic polyether moiety P.2' is polyethylene glycol) methyl ether.

In a preferred embodiment of the presently claimed invention, $R^5$ is H.

In a more preferred embodiment of the presently claimed invention, $R^5$ is H and Q is O.

In a most preferred embodiment of the presently claimed invention, L.1 is

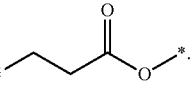

In a more preferred embodiment of the presently claimed invention, L.2 is

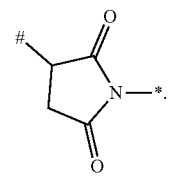

In a more preferred embodiment of the presently claimed invention, L.3 is

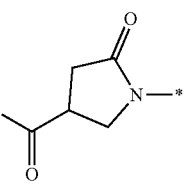

In a more preferred embodiment of the presently claimed invention, Z is C, aralkyl.

In a most preferred embodiment of the presently claimed invention, Z is 2,4-toluoyl.

In a preferred embodiment of the presently claimed invention, L.4 is

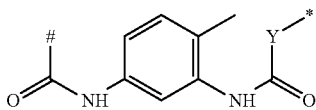

wherein
# indicates the point of attachment to a nitrogen atom of the polyalkyleneimine backbone;
* indicates the point of attachment to the aliphatic polyether moiety P.2;
Y is O or NH.

In a preferred embodiment of the presently claimed invention, L is

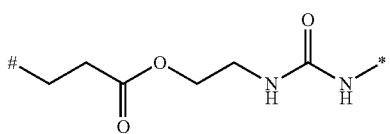

wherein # and * are defined as above.

In a preferred embodiment of the presently claimed invention, the polymer of the presently claimed invention comprises
a) from 0.5 to 25 weight % of the polyalkyleneimine backbone, based on the total weight of the polymer;
b) from 0.5 to 25 weight % of the at least one aromatic moiety P.1, based on the total weight of the polymer; and
c) from 30 to 90 weight % by of the at least one aliphatic polyether moiety P.2, based on the total weight of the polymer.

In a more preferred embodiment of the presently claimed invention, the polymer of the presently claimed invention comprises
a) from 1 to 20 weight % of the polyalkyleneimine backbone, based on the total weight of the polymer;
b) from 1 to 20 weight % of the at least one aromatic moiety P.1, based on the total weight of the polymer; and
c) from 30 to 90 weight % by of the at least one aliphatic polyether moiety P.2, based on the total weight of the polymer.

In an even more preferred embodiment of the presently claimed invention, the polymer of the presently claimed invention comprises
a) from 1 to 10 weight % of the polyalkyleneimine backbone, based on the total weight of the polymer;
b) from 1 to 10 weight % of the at least one aromatic moiety P.1, based on the total weight of the polymer; and
c) from 30 to 90 weight % by of the at least one aliphatic polyether moiety P.2, based on the total weight of the polymer.

In a preferred embodiment of the presently claimed invention, the polymer has a weight average molecular weight ($M_w$) in the range of 1000 to 200000 g/mol, as determined according to DIN 55672-1.

In a more preferred embodiment of the presently claimed invention, the polymer has a weight average molecular weight ($M_w$) in the range of 2000 to 100000 g/mol, as determined according to DIN 55672-1.

In an even more preferred embodiment of the presently claimed invention, the polymer has a weight average molecular weight ($M_w$) in the range of 2000 to 50000 g/mol, as determined according to DIN 55672-1.

In a most preferred embodiment of the presently claimed invention, the polymer has a weight average molecular weight ($M_w$) in the range of 5000 to 25000 g/mol, as determined according to DIN 55672-1.

In a preferred embodiment of the presently claimed invention, the polymer has a number average molecular weight ($M_n$) in the range of 500 to 100000 g/mol, as determined according to DIN 55672-1.

In a more preferred embodiment of the presently claimed invention, the polymer has a number average molecular weight ($M_n$) in the range of 1000 to 50000 g/mol, as determined according to DIN 55672-1.

In an even more preferred embodiment of the presently claimed invention, the polymer has a number average molecular weight ($M_n$) in the range of 1000 to 25000 g/mol, as determined according to DIN 55672-1.

In a most preferred embodiment of the presently claimed invention, the polymer has a number average molecular weight ($M_n$) in the range of 2000 to 12000 g/mol, as determined according to DIN 55672-1.

In a preferred embodiment of the presently claimed invention, the polymer has an amine number in the range of 2 to 1000 mg KOH/g, as determined according to DIN 53176:2002-11.

In a more preferred embodiment of the presently claimed invention, the polymer has an amine number in the range of 10 to 500 mg KOH/g, as determined according to DIN 53176:2002-11.

In an even more preferred embodiment of the presently claimed invention, the polymer has an amine number in the range of 15 to 300 mg KOH/g, as determined according to DIN 53176:2002-11.

In a most preferred embodiment of the presently claimed invention, the polymer has an amine number in the range of 20 to 150 mg KOH/g, as determined according to DIN 53176:2002-11.

In a particularly preferred embodiment of the presently claimed invention, the polymer has an amine number in the range of 25 to 100 mg KOH/g, as determined according to DIN 53176:2002-11.

In another aspect, the presently claimed invention provides a process for preparing the polymer. The process comprises the following steps,
i. A polyalkyleneimine is reacted with an aromatic carboxylic acid, an aromatic carboxylic anhydride or with an amide or imide forming derivative of an aromatic carboxylic acid, in such an amount that theoretically at most 90%, based on the total amount of primary and secondary nitrogen atoms of the polyalkyleneimine can be consumed.
ii. The product of step (i) is reacted with an aliphatic polyether moiety having a terminal radical selected from an acrylate, an iscyanato, and a carboxylate.

In another aspect, the presently claimed invention provides a process for preparing the polymer. The process comprises the following steps,
i. A polyalkyleneimine is reacted with an aromatic carboxylic acid, an aromatic carboxylic anhydride or with an amide or imide forming derivative of an aromatic carboxylic acid, in such an amount that theoretically at most 90%, based on the total amount of primary and secondary nitrogen atoms of the polyalkyleneimine can be consumed.
ii. The product of step (i) is reacted with an acrylate ester and an aliphatic polyether moiety.

In a preferred embodiment of the presently claimed invention, the aromatic carboxylic acid is

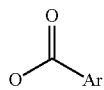

wherein Ar is defined as above.

In a preferred embodiment of the presently claimed invention, the aromatic carboxylic anhydride is

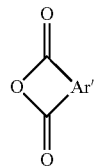

wherein Ar' is defined as above.

In a preferred embodiment of the presently claimed invention the aromatic carboxylic anhydride is selected from the group consisting of moieties of formulae (P.1d') and (P.1e'),

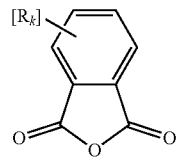
(P.1d')

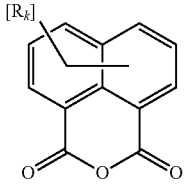
(P.1e')

wherein, R and k are defined as above.

In a more preferred embodiment of the presently claimed invention, the aromatic carboxylic anhydride is 1,8-naphthalic anhydride.

In a preferred embodiment of the presently claimed invention, the amide or imide forming derivative of an aromatic carboxylic acid is selected from compounds of formula (I),

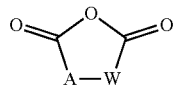

I wherein
W is a chemical bond or a divalent moiety selected from the group consisting of —O—, —NH— and —S—; and
A is an unsubstituted or substituted aromatic group selected from the group consisting of the formula

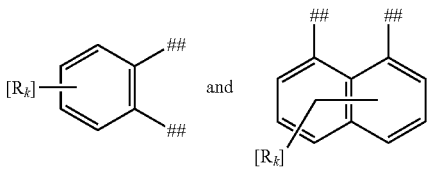

wherein
## indicates the point of attachment to the compound of formula (I), and
k and R are defined as above.

In a preferred embodiment of the presently claimed invention, the compound of formula (I) is isatoic anhydride.

In a preferred embodiment of the presently claimed invention, the aliphatic polyether moiety having a terminal radical selected from an acrylate, an iscyanato and a carboxylate is selected from

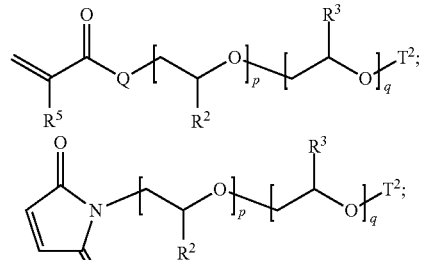

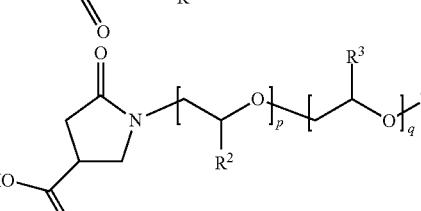

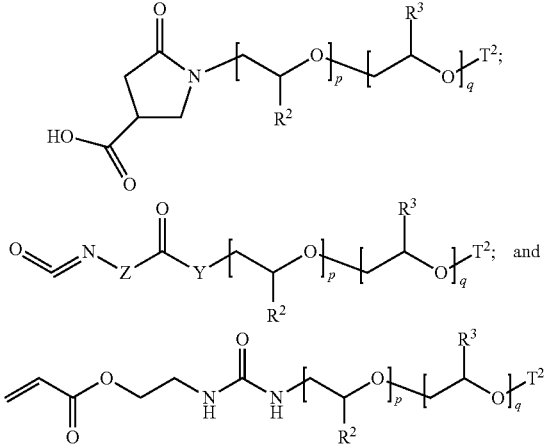

wherein $R^5$, Q, $R^2$, $R^3$, $T^2$, Y and Z are defined as above.

In a preferred embodiment of the presently claimed invention, the at least one aliphatic polyether moiety is polyethylene glycol) methyl ether.

The dispersants of the presently claimed invention can be used in broad application fields, such as coatings, inks and electronic materials. These dispersants can be used in solvent-based systems such as organic and inorganic pigments dispersion, e.g. in alkyd, CAB (cellulose acetate butyrate), UV (Ultraviolet) and TPA (thermoplastic acrylate) paint systems, industrial coatings. These dispersants can also be used water-based systems such as printing inks and graphic arts.

In yet another aspect, the presently claimed invention provides a liquid composition in the form of a dispersion comprising a particulate solid material selected from the group consisting of pigments and fillers, and a liquid diluent, wherein the particulate solid material is dispersed in the liquid diluent, further comprising a polymer of the presently claimed invention.

In a preferred embodiment of the presently claimed invention, the weight ratio of particulate solid material to the polymer is in the range from 100:1 to 1:2.

In a preferred embodiment of the presently claimed invention, the weight ratio of particulate solid material to the polymer is in the range from 100:1 to 1:2; more preferably in the range from 100:1 to 1:1; even more preferably from 100:1 to 10:1; and most preferably from 100:1 to 50:1.

In another preferred embodiment of the presently claimed invention, the weight ratio of particulate solid material to the polymer is in the range from 50:1 to 1:2; more preferably in the range from 10:1 to 2:1; and most preferably from 5:1 to 2:1.

In a preferred embodiment of the presently claimed invention, the size of the solid particulate material represented as the weight average particle diameter is in the range from 1 nm to 20000 nm; more preferably form 10 nm to 10000 nm; and most preferably from 20 nm to 500 nm. The weight average particle diameter may be determined by sieving analysis or by light scattering methods.

The pigments can be inorganic or organic.

In a preferred embodiment of the presently claimed invention, the organic pigments are pigments and pearlescent flakes selected from the group consisting of azo, disazo, naphthol, benzimidazolone, azocondensation, metal complex, isoindolinone, and isoindoline pigments, the chinophthalon pigment, dioxazine pigment and the polycyclic pigment selected from the group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, anthantrones, isoviolanthrones, diketopyrrolopyrrole, and carbazoles, e.g. carbazole violet, and the like. Further examples of organic pigments can be found in the monograph: W. Herbst, K. Hunger "*Industrielle Organische Pigmente*" $2^{nd}$ Edition, 1995, VCH Verlagsgesellschaft, ISBN: 3-527-28744-2.

In a preferred embodiment of the presently claimed invention, the inorganic pigments are selected from the group consisting of metallic flakes, such as aluminum, aluminum oxide, calcium carbonate, silicon oxide and silicates, iron(III)oxide, chromium(III)oxide, titanium(IV)oxide, zirconium(IV)oxide, zinc oxide, zinc sulphide, zinc phosphate, mixed metal oxide phosphates, molybdenum sulphide, cadmium sulphide, carbon black or graphite, vanadates, such as bismuth vanadate, chromates, such as lead(IV)chromate, and molybdates, such as lead(IV)molybdate, and mixtures, crystal forms or modifications thereof, such as rutile, anatase, mica, talcum, kaolin, and mixtures thereof.

In a preferred embodiment of the presently claimed invention, the pigment is carbon black and the weight average particle diameter of the pigment is in the range from 100 nm to 300 nm.

In a preferred embodiment of the presently claimed invention, the fillers are selected from the group consisting of calcium carbonate, silicates, glass fibers, glass beads, talc, kaolin, mica, barium sulphate, metal oxides and hydroxides, carbon black, graphite, wood powders, powders and fibers of other natural products, synthetic fibers and mixtures thereof.

The liquid diluent present in the dispersion will depend on the field of application.

For water-based formulations, the liquid diluent comprises water. The liquid diluent may further comprise polar, water-miscible solvents such as $C_1$-$C_4$alkanols, e.g. methanol, ethanol, isopropanol, propanol or n-butanol, glycol ethers like butyl glycol, or methoxypropylene glycol, polyols, e.g. glycerol, ethyleneglycol, diethyleneglycol, triethylene, triethylene glycol, propylene glycol or butyl diglycol; or mixtures thereof.

For solvent-based formulations, the liquid diluent is selected from low polarity solvents such as aliphatic hydrocarbons, esters like butyl acetate, or glycol ethers like methoxypropylene glycol and glycol ether esters like methoxypropylene glycol acetate and mixtures thereof.

In a preferred embodiment of the presently claimed invention, the weight ratio of the fine particulate solid materials to the liquid diluent is in the range from 100:1 to 1:50; and more preferably in the range from 30:1 to 1:10.

The dispersion further comprises a binder and/or one or more additives depending on the intended use. The additives include but are not limited to plasticizers, lubricants, emulsifiers, humectants, rheology additives, catalysts, flow auxiliaries, optical brighteners, flame retardants, preservatives, antistatic agents and blowing agents.

In a preferred embodiment of the presently claimed invention, the liquid composition is in the form of a millbase, a coating composition or an ink.

In a preferred embodiment of the presently claimed invention, the dispersion is in the form of a mill base. The millbase comprises the fine particulate solid materials, the dispersant of formula (I), the liquid diluent and optionally additives, but generally millbase will not contain binders.

In a preferred embodiment of the presently claimed invention, the dispersion is in the form of a coating composition. The coating composition comprises the fine particulate solid materials, the dispersant of formula (I), the liquid diluent and additionally at least one binder, e.g. film-forming polymers or prepolymers which form a film upon curing. The coating composition further comprise additives conventionally used in coating technology, e.g. plasticizers, lubricants, emulsifiers, rheology additives, catalysts, flow auxiliaries, optical brighteners, flame retardants, preservatives, antistatic agents or blowing agents.

In a preferred embodiment of the presently claimed invention, the dispersion is in the form of an ink composition, e.g. a printing ink or a gravure ink. The ink composition comprises the fine particulate solid materials, the dispersant of formula (I), the liquid diluent and additionally at least one binder conventionally used in ink technology, e.g. film-forming polymers or prepolymers which form a film upon curing.

In yet another aspect, the presently claimed invention provides use of the polymer of the presently claimed invention as a component of a coating composition or an ink composition.

The presently claimed invention offers one or more of the following advantages:
1) The dispersants of the presently claimed invention provide stable dispersions with a high pigment loading.
2) The dispersions containing the dispersants of the presently claimed invention have a low viscosity. The viscosity of the dispersions is significantly low even at a high pigment loading.
3) The dispersants of the presently claimed invention enhance the rheology behavior of dispersions. Further, their rheology behavior does not change with time.

4) Surfaces coated with coating compositions comprising the dispersants of the presently claimed invention display good surface properties such as a high gloss and a reduced crater number.

In the following, there is provided a list of embodiments to further illustrate the present disclosure without intending to limit the disclosure to the specific embodiments listed below.

1. A polymer having
   a) a polyalkyleneimine backbone;
   b) at least one aromatic moiety P.1, which is bound to a nitrogen atom of the polyalkyleneimine backbone via a carboxamide or carboximide group; and
   c) at least one aliphatic polyether moiety P.2, which is bound to a nitrogen atom of the polyalkyleneimine backbone via a linker L.
2. The polymer according to embodiment 1, wherein the polyalkyleneimine backbone has a weight average molecular weight in the range of from 100 g/mol to 20,000 g/mol, as determined according to DIN 55672-1.
3. The polymer according to embodiment 1 or 2, wherein the polyalkyleneimine backbone is a polyethyleneimine backbone.
4. The polymer according to any of embodiments 1 to 3, wherein the at least one aromatic moiety P.1 is selected from the moieties of the formulae (P.1') and (P.1''),

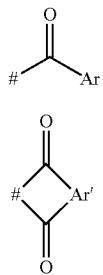

(P.1')

(P.1'')

wherein
# indicates the point of attachment of the aromatic moiety P.1 to a nitrogen atom of the polyalkyleneimine backbone;
Ar is selected from the group consisting of phenyl and naphthyl, wherein phenyl and naphthyl, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(=O)—OH, C(=O)—NH$_2$, NH$_2$, NO$_2$, NH—C(=O)—H, NH—$C_1$-$C_4$-alkyl and NH—C(=O)—$C_1$-$C_4$-alkyl; and
Ar' is selected from the group consisting of 1,2-phenylene, 1,2-, 2,3-, or 1,8-naphthylene, wherein phenylene and naphthylene, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(=O)—OH, C(=O)—NH$_2$, NH$_2$, NO$_2$, NH—C(=O)—H, NH—$C_1$-$C_4$-alkyl, and NH—C(=O)—$C_1$-$C_4$-alkyl.
5. The polymer according to any of embodiments 1 to 4, wherein the at least one aromatic moiety P.1 is selected from the group consisting of moieties of formulae (P.1a), (P.1b), (P.1c) (P.1d), and (P.1e)

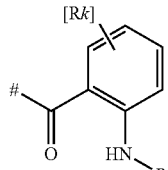

(P.1a)

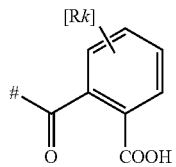

(P.1b)

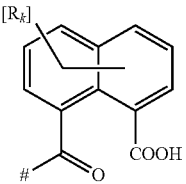

(P.1c)

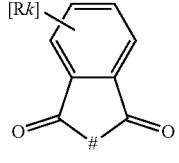

(P.1d)

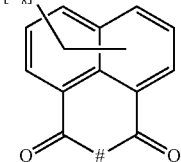

(P.1e)

wherein
# indicates the point of attachment of the aromatic moiety to a nitrogen atom of the polyalkyleneimine backbone;
R' is selected from the group consisting of hydrogen, $C_1$-$C_4$-alkyl, —C(=O)—H and —C(=O)—$C_1$-$C_4$-alkyl;
k is 0, 1, 2, 3 or 4; and
R is, identical or different, a radical selected from the group consisting of halogen, OH, $C_1$-$C_4$-alkyl, $C_1$-$C_4$-alkoxy, C(=O)—OH, C(=O)—NH$_2$, NH$_2$, NO$_2$, NH—C(=O)—H, NH—$C_1$-$C_4$-alkyl, and NH—C(=O)—$C_1$-$C_4$-alkyl.
6. The polymer according to any of embodiments 1 to 5, wherein the at least one aliphatic polyether moiety P.2 is

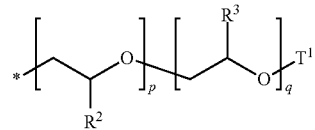

(P.2)

wherein,
indicates the point of attachment to a linker L;

R² and R³ are each independently selected from the group consisting of hydrogen and C₁-C₂-alkyl;
p is an integer from 0 to 200;
q is an integer from 0 to 200;
p+q is an integer from 2 to 200; and
T¹ is hydrogen, C₁-C₂₀-alkyl, C₂-C₂₀-alkenyl, C(=O)—C₂-C₂₀-alkenyl or C(=O)—C₁-C₂₀-alkyl, wherein C₂-C₂₀-alkenyl has 1, 2, 3 or 4 olefinic C=C-double bonds, and wherein 1, 2, 3, or 4 non-adjacent CH₂ groups of C₁-C₂₀-alkyl may be replaced by 0.

7. The polymer according to embodiment 6, wherein
   p is an integer from 0 to 100;
   q is an integer from 0 to 100; and
   p+q is an integer from 2 to 100.

8. The polymer according to embodiment 6, wherein
   R² is H, p is an integer from 2 to 100;
   q is 0; and
   T¹ is H.

9. The polymer according to embodiment 6, wherein
   R² is H, p is an integer from 1 to 100;
   R³ is —CH₃, q is an integer 1 to 100;
   p+q is an integer from 2 to 150 and
   T¹ is H or CH3.

10. The polymer according to embodiment 6, wherein the linker L is at least one selected from the group consisting of (L.1), (L.2), (L.3), (L.4) and (L.5)

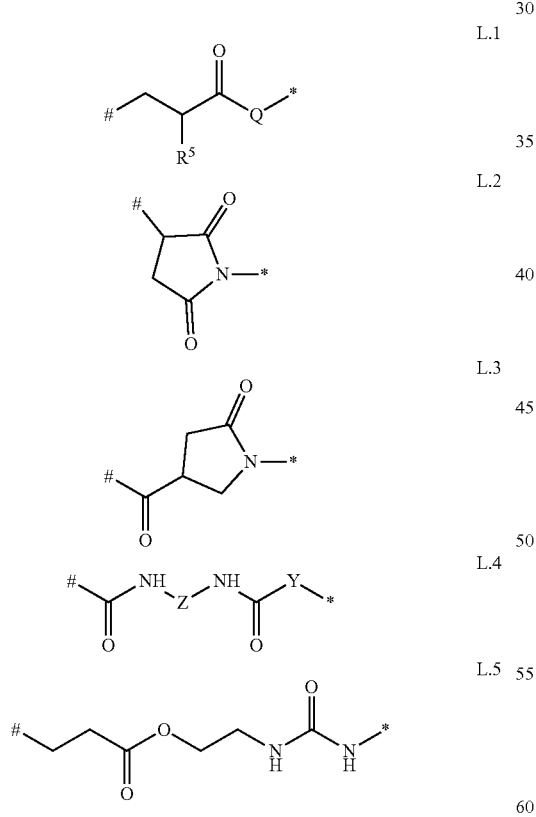

wherein
# indicates the point of attachment to a nitrogen atom of the polyalkyleneimine backbone;
indicates the point of attachment to the aliphatic polyether moiety P.2;
R⁵ is H or CH₃;

Q is a direct bond or a divalent moiety selected from —O—, —N(H)—, and —S—;
Y is O or NH;
Z is selected from the group consisting of C₁-C₂₄ alkyl, C₄-C₁₀ cycloalkyl, C₆-C₁₈ aryl, and C₇-C₂₀ arylalkyl;

11. The polymer according to embodiment 10, wherein R⁵ is H.

12. The polymer according to embodiment 10, wherein L.4 is

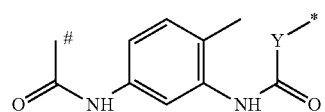

wherein
# indicates the point of attachment to a nitrogen atom of the polyalkyleneimine backbone;
indicates the point of attachment to the aliphatic polyether moiety P.2;
Y is O or NH.

13. The polymer according to any of embodiments 1 to 12 comprising
   a) from 0.5 to 25 weight % of the polyalkyleneimine backbone, based on the total weight of the polymer;
   b) from 0.5 to 25 weight % of the at least one aromatic moiety P.1, based on the total weight of the polymer; and
   c) from 30 to 90 weight % by of the at least one aliphatic polyether moiety P.2, based on the total weight of the polymer.

14. The polymer according to any of embodiments 1 to 13, wherein the polymer has an amine number in the range of 2 to 1000 mg KOH/g, as determined according to DIN 53176:2002-11.

15. The polymer according to any of embodiments 1 to 14, the polymer has a number average molecular weight ($M_n$) in the range of 500 to 100000 g/mol, as determined according to DIN 55672-1.

16. The polymer according to any of embodiments 1 to 14, wherein the polymer has a weight average molecular weight ($M_w$) in the range of 1000 to 200000 g/mol, as determined according to DIN 55672-1.

17. A process for preparing the polymer according to any of embodiments 1 to 16, comprising the following steps,
   i. reacting a polyalkyleneimine with an aromatic carboxylic acid, an aromatic carboxylic anhydride or with an amide or imide forming derivative of an aromatic carboxylic acid, in such an amount that theoretically at most 90%, based on the total amount of primary and secondary nitrogen atoms of the polyalkyleneimine can be consumed; and
   ii. reacting the product of step (i) with an aliphatic polyether moiety having a terminal radical selected from an acrylate, an iscyanato, and a carboxylate.

18. The process according to embodiment 17, wherein the aromatic carboxylic acid is

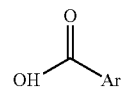

wherein Ar is defined as in any of embodiments 1 to 16.
19. The process according to embodiment 17 or 18, wherein the aromatic carboxylic anhydride is

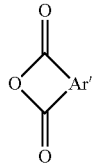

wherein Ar' is defined as in any of embodiments 1 to 16.
20. The process according to any of embodiments 17 to 19, wherein the amide or imide forming derivative of an aromatic carboxylic acid is selected from compounds of formula (I),

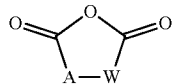

(I)

wherein
W is a chemical bond or a divalent moiety selected from the group consisting of —O—, —NH— and —S—; and
A is an unsubstituted or substituted aromatic group selected from the group consisting of the formula

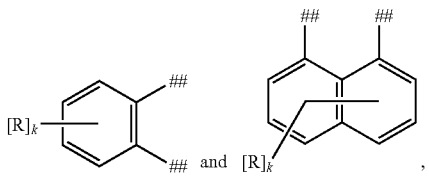

wherein
## indicates the point of attachment to the compound of formula (I), and
k and R are defined as in any of embodiments 1 to 16.
21. The process according to any of embodiments 17 to 20, wherein the aliphatic polyether moiety having a terminal radical selected from an acrylate, an iscyanato and a carboxylate is selected from

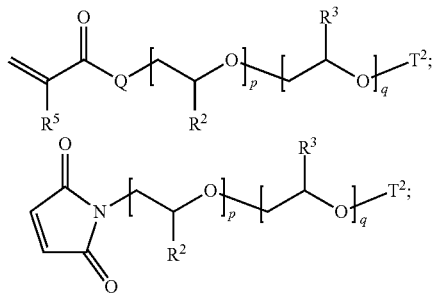

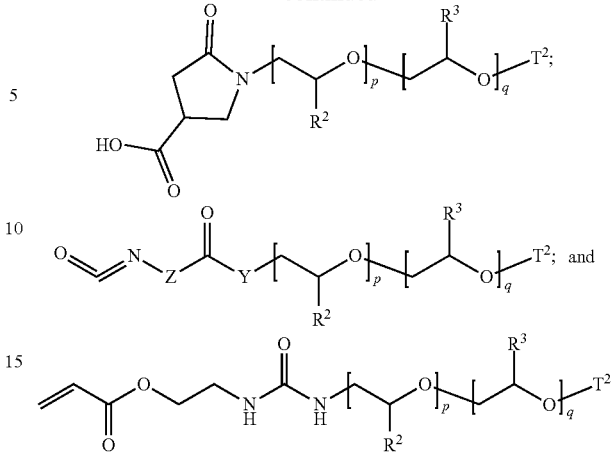

wherein $R^5$, Q, $R^2$, $R^3$, $T^2$, Y and Z are defined as in any of embodiments 1 to 16.
22. A liquid composition in the form of a dispersion comprising a particulate solid material selected from the group consisting of pigments and fillers, a liquid diluent, wherein the particulate solid material is dispersed in the liquid diluent, further comprising a polymer according to any of embodiments 1 to 16.
23. The liquid composition according to embodiment 22, wherein the weight ratio of particulate solid material to the polymer is in the range from 100:1 to 1:2.
24. The liquid composition according to embodiment 22 or 23, which is in the form of a millbase, a coating composition or an ink.
25. Use of the polymer according to any of embodiments 1 to 16 as a component of a coating composition or an ink composition.

While the presently claimed invention has been described in terms of its specific embodiments, certain modifications and equivalents will be apparent to those skilled in the art and are intended to be included within the scope of the presently claimed invention.

EXAMPLES

The presently claimed invention is illustrated in detail by non-restrictive working examples which follow. More particularly, the test methods specified hereinafter are part of the general disclosure of the application and are not restricted to the specific working examples.
Materials
  Lupasol® FG —Polyethyleneimine with a weight average molecular weight 800 g/mol as determined according to DIN 55672-1 is available from BASF SE.
  Jeffamine® M 2005—Polyetherimine having a weight average molecular weight of 2000 g/mol as determined according to DIN 55672-1, and having a PO/EO ratio of about 29/6; and
  Jeffamine® M 2070—Polyetherimine having a weight average molecular weight of 2000 g/mol as determined according to DIN 55672-1, and having a PO/EO ratio of about 10/31
  are available from Huntsman Corporation, Belgium.
  Desmodur® T 100SP—Pure 2,4'-toluene diisocyanate (TDI) is available from Covestro AG.
  Carbon Black FW 200—Amorphous carbon black is available from Orion Engineered Carbons GmbH.

CAB®-531—Cellulose acetate butyrate is available from Eastman Chemical Company, UK.

Uracron™ CR 226 XB—Thermosetting hydroxy acrylic resin; and

Uramex™ MF 821—Non-plasticized n-butylated melamine formaldehyde resin are available from DSM Coating Resins B. V.

Methods

Acid number: The acid number was determined according to DIN 53402:1990-09.

Amine number: The amine number was determined according to DIN 53176:2002-11.

Isocyanate (NCO) content: The isocyanate (NCO) content was determined according to DIN 14896:2009-07.

Viscosity: The viscosity was determined by analogy to DIN 53019-1:2008-09, using a ThermoHaake RheoStress 600 equipment under the CR mode at 22° C. and a shear rate of 1 sec$^{-1}$ (Spindle CP50).

Molecular weight: The Mw was determined according to DIN 55672-1.

A) Preparation of the Dispersants i) Preparation of Intermediates

Intermediate A1

A mixture of 50 g Lupasol® FG (polyethyleneimine, MW of 800 g/mol) and 50 g 1,8-naphthalic anhydride was stirred at 150° C. under nitrogen atmosphere until the acid number of the mixture was less than 5 mg KOH/g to obtain intermediate A1.

Intermediate A2

A mixture of 50 g Lupasol® FG (polyethyleneimine, MW of 800 g/mol) and 25 g 1,8-naphthalic anhydride was stirred at 150° C. under nitrogen atmosphere until the acid number of the mixture was less than 5 mg KOH/g to obtain intermediate A2.

Intermediate A3

A mixture of 50 g Lupasol® FG (polyethyleneimine, MW of 800 g/mol) and 30 g isatoic anhydride was stirred at room temperature for 1 h. The temperature of the mixture was slowly increased to 60° C. followed by stirring the mixture at 60° C. until the release of carbon dioxide ceased. Intermediate A3 having an amine number of 860 mg KOH/g was obtained.

Intermediate B1

A mixture of 50 g polyethylene glycol) methyl ether (MW of 500 g/mol) and 12 g acrylic anhydride was stirred at room temperature for 1 h. The temperature of the mixture was slowly increased to 80° C. followed by stirring the mixture at 80° C. for 2h. The acrylic acid formed during the reaction was removed under reduced pressure to obtain intermediate B1. The acrylic functionality content of intermediate B1 was 0.95, as determined using $^1$H-NMR.

Intermediate B2

A mixture of 50 g Jeffamine® M 2005 (MW of 2000 g/mol) and 2.4 g maleic anhydride was stirred at room temperature for 1 h. The temperature of the mixture was slowly increased to 130° C. followed by stirring the reaction mixture at 130° C. until the acid number of the reaction mixture was less than 5 mgKOH/g to obtain intermediate B2.

Intermediate B3

A mixture of 50 g Jeffamine® M 2070 (MW of 2000 g/mol) and 3.2 g itaconic acid was stirred at room temperature for 1 h. The temperature of the reaction mixture was slowly increased to 150° C. under nitrogen atmosphere, followed by stirring at 150° C. until the acid number of the reaction mixture was less than 30 mgKOH/g to obtain intermediate B3.

Intermediate B4

A mixture of 14.4 g Desmodur® T 100SP and 30 g ethyl acetate was stirred in a reactor at room temperature. 50 g Jeffamine® M 600 (MW of 600 g/mol) was slowly charged to the reactor over 2h at room temperature. The resultant mixture was slowly heated to 40° C. followed by stirring at 40° C. for 1 h to obtain intermediate B4 having a NCO content of 3.6%.

Intermediate B4 should be fresh prepared before each usage.

Intermediate B5

A mixture of 11.8 g 2-isocyanatoethyl acrylate and 30 g ethyl acetate was stirred in a reactor at room temperature. 166 g Jeffamine® M 2005 (MW of 2000 g/mol) was slowly charged to the reactor at room temperature over 2 h. The resultant mixture was slowly heated to 40° C. followed by stirring the reaction mixture at 40° C. for 1 h to obtain intermediate B5 having an NCO content of 0.

ii) Preparation of Dispersants from Intermediates

Example 1: Preparation of Dispersant 1

A mixture of 10 g intermediate A1 and 50 g intermediate B1 was heated at 50° C. until the reaction mixture did not show the presence of the acrylic functionality, as determined using $^1$H NMR. Dispersant 1 was obtained as a viscous liquid having an amine number: 86 mg KOH/g, GPC: Mn 3500 g/mol, Mw 8500 g/mol and PDI of 1.9.

Example 2: Preparation of Dispersant 2

A mixture of 10 g intermediate A1 and 100 g intermediate B2 was heated at 50° C. until the reaction mixture did not show the presence of the acrylic functionality, as determined using $^1$H NMR. Dispersant 2 was obtained as a viscous liquid having an amine number: 45 mg KOH/g, GPC: Mn 5600 g/mol, Mw 10500 g/mol and PDI of 1.9.

Example 3: Preparation of Dispersant 3

A mixture of 10 g intermediate A1 and 100 g intermediate B3 was heated at 150° C. under reduced pressure until the acid number of the reaction mixture was less than 5 mgKOH/g. Dispersant 3 was obtained as a viscous liquid having an amine number: 35 mg KOH/g, GPC: Mn 4650 g/mol, Mw 9700 g/mol and PDI of 2.1.

Example 4: Preparation of Dispersant 4

A mixture of 10 g intermediate A1 and 20 g ethyl acetate was stirred at room temperature. 50 g intermediate B4 was slowly added to the mixture followed by heating the mixture at 50° C. until the NCO content of the reaction mixture was zero. Dispersant 4 was obtained as a viscous liquid having an amine number: 51 mg KOH/g, GPC: Mn 4250 g/mol, Mw 9050 g/mol and PDI of 2.1.

Example 5: Preparation of Dispersant 5

A mixture of 10 g intermediate A1 and 100 g intermediate B5 was heated at 50° C. until the reaction mixture did not show the presence of acrylic functionality, as determined using $^1$H NMR. Dispersant 5 was obtained as a viscous liquid having an Amine number: 76 mg KOH/g, GPC: Mn 6700 g/mol, Mw 12500 g/mol and PDI of 1.9.

Example 6: Preparation of Dispersant 6

A mixture of 10 g intermediate A2 and 100 g intermediate B5 was heated at 50° C. until the reaction mixture did not show the presence of acrylic functionality, as determined using $^1$H NMR. Dispersant 6 was obtained as a viscous liquid having an amine number: 70 mg KOH/g, GPC: Mn 5500 g/mol, Mw 10500 g/mol and PDI of 1.9.

Example 7: Preparation of Dispersant 7

A mixture of 10 g intermediate A1 and 10 g n-butyl acrylate was heated at 60° C. for 5h. 100 g polyethylene glycol) methyl ether (MW of 500 g/mol) and 0.5 g tetra-n-butyl titanate was added to the mixture followed by heating the resultant mixture at 140° C. The n-butanol formed during the reaction was removed under reduced pressure. The heating was stopped when the n-butanol formation ceased. Dispersant 7 was obtained as a viscous liquid having an amine number: 48 mg KOH/g, GPC: Mn 3200 g/mol, Mw 7500 g/mol and PDI of 2.3.

Example 8: Preparation of Dispersant 8

A mixture of 10 g intermediate A3 and 20 g ethyl acetate was stirred at room temperature. 50 g intermediate B4 was slowly added to the mixture, followed by heating the reaction mixture at 50° C. until the NCO content of the reaction mixture was zero. Dispersant 8 was obtained as a viscous liquid having an amine number: 75 mg KOH/g, GPC: Mn 5100 g/mol, Mw 9950 g/mol and PDI of 2.0.

B) Performance Testing:

Step 1: Preparation of Millbase

In order to test the dispersion effect of the obtained dispersants, a resin free millbase (water-based pigment concentrate) having the composition according to Formulation 1 was prepared.

Formulation 1. Preparation of Pigment Concentrates

| Sr. | Component | Amount |
|---|---|---|
| 1 | Dispersant (100% solid) | 4.9 g |
| 2 | 1-Methoxy-2-propylacetate solvent | 25.2 g |
| 3 | Pigment: Carbon Black FW 200 | 4.9 g |
| 4 | 2.0 mm glass beads | 35 g |
| | Total | 70 g |

The milling step was carried out using a Scandex Shaker over 4 h with the help of glass beads to obtain a dispersion or millbase. The millbase was filtered and stored at room temperature overnight.

The rheological behaviour of the millbase was evaluated with a Thermo-Haake RheoStress 600 equipment under the CR mode. The viscosity of the millbase was determined and the results are summarized in Table 1.

TABLE 1

Millbase viscosity (Viscosity @ 1 S$^{-1}$)

| Dispersant | mpas |
|---|---|
| Intermediate A1 | 8500 |
| Intermediate B3 | 15500 |
| Dispersant 3 | 5700 |
| Dispersant 4 | 6500 |
| Dispersant 7 | 5950 |
| Dispersant 8 | 10500 |

It is evident from Table 1 that the millbases prepared using the dispersants of the presently claimed invention have a low millbase viscosity.

Step 2: Preparation of Paint Compositions Using the Millbases from Step 1

A paint composition was prepared by dispersing 2 g of millbase obtained in step-1 into 8 g let-down system (Formulation 2) via Dispermat® for 2 min at 2000 rpm.

Formulation 2. Composition of the let-down system

| | Component | Amount (Wt %) |
|---|---|---|
| CAB base coat | CAB ® 531-1 | 11.2 |
| | Butyl acetate | 51.9 |
| | Uracron ™ CR 226 XB | 32.1 |
| | Uramex ™ MF 821 | 4.8 |
| | Total | 100.0 |

The paint composition obtained in step 2 was applied on polyester film with a 75 µm film thickness and dried at 130° C. in oven for 30 min. The surface coating was evaluated, and the results are summarized in Table 2.

TABLE 2

Gloss (20°) and crater ranking

| Dispersant | Gloss | Crater* |
|---|---|---|
| Intermediate A1 | 50 | 4 |
| Intermediate B3 | 60 | 3 |
| Dispersant 3 | 72 | 1 |
| Dispersant 4 | 75 | 1 |
| Dispersant 7 | 75 | 1 |
| Dispersant 8 | 73 | 1 |

*1 means no crater and 5 means many craters

It is observed from Table 2 that the performance of the paint compositions prepared using the dispersants of the presently claimed invention was significantly better with respect to aesthetics and physical properties of surface coatings, which is evident from high quality film having satisfactory film properties, such as a high gloss and low crater ranking.

The invention claimed is:

1. A polymer having
a) a polyalkyleneimine backbone;
b) at least one aromatic moiety P.1, which is bound to a nitrogen atom of the polyalkyleneimine backbone via a carboxamide or carboximide group; and
c) at least one aliphatic polyether moiety P.2, which is bound to a nitrogen atom of the polyalkyleneimine backbone via a linker L;

wherein the linker L is at least one selected from the group consisting of (L.1), (L.2), (L.3) and (L.4) and (L.5)

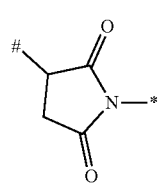

L.2

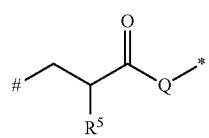

L.1

-continued

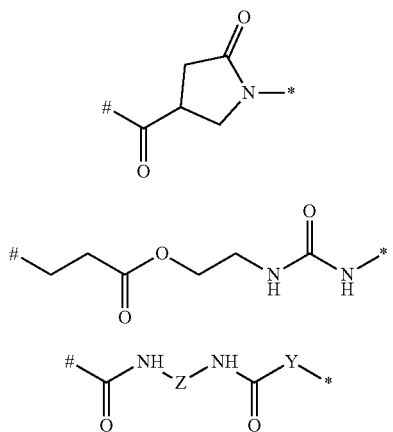

wherein
\# indicates the point of attachment to a nitrogen atom of the polyalkyleneimine backbone;
\* indicates the point of attachment to the aliphatic polyether moiety P.2;
$R^5$ is H or $CH_3$;
Q is a direct bond or a divalent moiety selected from —O—, —N(H)—, and —S—;
Y is O or NH;
Z is selected from the group consisting of $C_1$-$C_{24}$ alkyl, $C_4$-$C_{10}$ cycloalkyl, $C_6$-$C_{18}$ aryl, and $C_7$-$C_{20}$ arylalkyl.

2. The polymer according to claim 1, wherein the polyalkyleneimine backbone has a weight average molecular weight in the range of from 100 g/mol to 20,000 g/mol, as determined according to DIN 55672-1.

3. The polymer according to claim 1, wherein the polyalkyleneimine backbone is a polyethyleneimine backbone.

4. The polymer according to claim 1, wherein the at least one aromatic moiety P.1 is selected from the moieties of the formulae (P.1') and (P.1"),

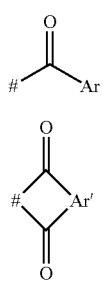

wherein
\# indicates the point of attachment of the aromatic moiety P.1 to a nitrogen atom of the polyalkyleneimine backbone;
Ar is selected from the group consisting of phenyl and naphthyl, wherein phenyl and naphthyl, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(=O)—OH, C(=O)—$NH_2$, $NH_2$, $NO_2$, NH—C(=O)—H, NH—$C_1$-$C_4$-alkyl and NH—C(=O)—$C_1$-$C_4$-alkyl; and Ar' is selected from the group consisting of 1,2-phenylene, 1,2-, 2,3-, or 1,8-naphthylene, wherein phenylene and naphthylene, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(=O)—OH, C(=O)—$NH_2$, $NH_2$, $NO_2$, NH—C(=O)—H, NH—$C_1$-$C_4$-alkyl, and NH—C(=O)—$C_1$-$C_4$-alkyl.

5. The polymer according to claim 1, wherein the at least one aromatic moiety P.1 is selected from the group consisting of moieties of formulae (P.1a), (P.1b), (P.1c), (P.1d), and (P.1e),

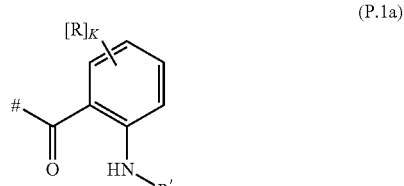

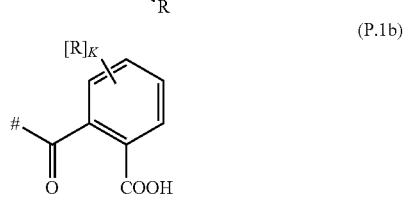

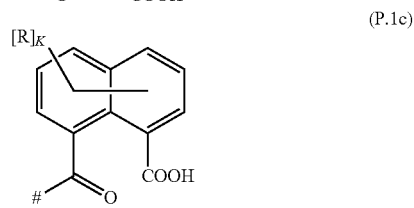

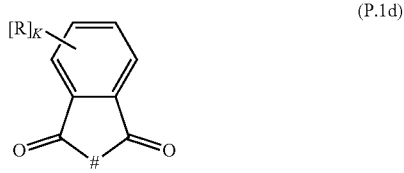

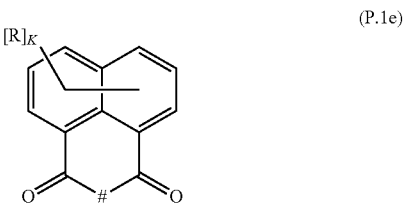

wherein
\# indicates the point of attachment of the aromatic moiety to a nitrogen atom of the polyalkyleneimine backbone;
R' is selected from the group consisting of hydrogen, $C_1$-$C_4$-alkyl, —C(=O)—H and —C(=O)—$C_1$-$C_4$-alkyl;
k is 0, 1, 2, 3 or 4; and
R is, identical or different, a radical selected from the group consisting of halogen, OH, $C_1$-$C_4$-alkyl, $C_1$-$C_4$-alkoxy, C(=O)—OH, C(=O)—$NH_2$, $NH_2$, $NO_2$, NH—C(=O)—H, NH—$C_1$-$C_4$-alkyl, and NH—C(=O)—$C_1$-$C_4$-alkyl.

6. The polymer according to claim 1, wherein the at least one aliphatic polyether moiety P.2 is (P.2)

wherein,
* indicates the point of attachment to linker L;
$R^2$ and $R^3$ are each independently selected from the group consisting of hydrogen and $C_1$-$C_2$-alkyl;
p is an integer from 0 to 200;
q is an integer from 0 to 200;
p+q is an integer from 2 to 200; and
$T^1$ is hydrogen, $C_1$-$C_{20}$-alkyl, $C_2$-$C_{20}$-alkenyl, C(=O)—$C_2$-$C_{20}$-alkenyl or C(=O)—$C_1$-$C_{20}$-alkyl, wherein $C_2$-$C_{20}$-alkenyl has 1,2, 3 or 4 olefinic C=C-double bonds, and wherein 1, 2, 3, or 4 non-adjacent $CH_2$ groups of $C_1$-$C_{20}$-alkyl may be replaced by 0.

7. The polymer according to claim 6, wherein
p is an integer from 0 to 100;
q is an integer from 0 to 100; and
p+q is an integer from 2 to 100.

8. The polymer according to claim 6, wherein
$R^2$ is H, p is an integer from 2 to 100;
q is 0; and
$T^1$ is H.

9. The polymer according to claim 6, wherein
$R^2$ is H, p is an integer from 1 to 100;
$R^3$ is —$CH_3$, q is an integer 1 to 100;
p+q is an integer from 2 to 150 and
$T^1$ is H or $CH_3$.

10. The polymer according to claim 1, wherein $R^5$ is H.

11. The polymer according to claim 1, wherein L.4 is wherein
# indicates the point of attachment to a nitrogen atom of the polyalkyleneimine backbone;
* indicates the point of attachment to the aliphatic polyether moiety P.2;
Y is O or NH.

12. The polymer according to claim 1 comprising
a) from 0.5 to 25 weight % of the polyalkyleneimine backbone, based on the total weight of the polymer;
b) from 0.5 to 25 weight % of the at least one aromatic moiety P.1, based on the total weight of the polymer; and
c) from 30 to 90 weight % by of the at least one aliphatic polyether moiety P.2, based on the total weight of the polymer.

13. The polymer according to claim 1, wherein the polymer has an amine number in the range of 2 to 1000 mg KOH/g, as determined according to DIN 53176:2002-11.

14. The polymer according to claim 1, wherein the polymer has a weight average molecular weight ($M_w$) in the range of 1000 to 200,000 g/mol, as determined according to DIN 55672-1.

15. The polymer according to claim 1, the polymer has a number average molecular weight ($M_n$) in the range of 500 to 100,000 g/mol, as determined according to DIN 55672-1.

16. A process for preparing the polymer according to claim 1, comprising the following steps,
i. reacting a polyalkyleneimine with an aromatic carboxylic acid, an aromatic carboxylic anhydride or with an amide or imide forming derivative of an aromatic carboxylic acid, in such an amount that theoretically at most 90%, based on the total amount of primary and secondary nitrogen atoms of the polyalkyleneimine can be consumed; and
ii. reacting the product of step (i) with an aliphatic polyether moiety having a terminal radical selected from an acrylate, an iscyanato, and a carboxylate.

17. The process according to claim 16, wherein the aromatic carboxylic acid is wherein Ar is selected from the group consisting of phenyl and naphthyl, wherein phenyl and naphthyl, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(=O)—OH, C(=O)—$NH_2$, $NH_2$, $NO_2$, NH—C(=O)—H, NH—$C_1$-$C_4$-alkyl and NH—C(=O)—$C_1$-$C_4$-alkyl.

18. The process according to claim 16, wherein the aromatic carboxylic anhydride is wherein Ar' is selected from the group consisting of 1,2-phenylene, 1,2-, 2,3-, or 1,8-naphthylene, wherein phenylene and naphthylene, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(=O)—OH, C(=O)—$NH_2$, $NH_2$, $NO_2$, NH—C(=O)—H, NH—$C_1$-$C_4$-alkyl and NH—C(=O)—$C_1$-$C_4$-alkyl.

19. The process according to claim 16, wherein the amide or imide forming derivative of an aromatic carboxylic acid is selected from compounds of formula (I), (I)

wherein
W is a chemical bond or a divalent moiety selected from the group consisting of —O—, —NH— and —S—; and A is an unsubstituted or substituted aromatic group selected from the group consisting of the formula

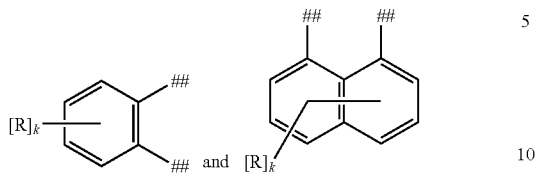

wherein
## indicates the point of attachment to the compound of formula (I), and k is 0, 1, 2, 3, or 4;
and R is, identical or different, a radical selected from the group consisting of halogen, OH, $C_1$-$C_4$-alkyl, $C_1$-$C_4$-alkoxy, C(=O)—OH, C(=O)—$NH_2$, $NH_2$, $NO_2$, NH—C(=O)—H, NH—$C_1$-$C_4$—alkyl and NH—C(=O)—$C_1$-$C_4$-alkyl.

20. A liquid composition in the form of a dispersion comprising a particulate solid material selected from the group consisting of pigments and fillers, a liquid diluent, wherein the particulate solid material is dispersed in the liquid diluent, further comprising a polymer according to claim 1.

21. The liquid composition according to claim 20, wherein the weight ratio of particulate solid material to the polymer is in the range from 100:1 to 1:2.

22. The liquid composition according to claim 20, which is in the form of a millbase, a coating composition or an ink.

* * * * *